| (12) | United States Patent | (10) Patent No.: | US 10,843,765 B2 |
|---|---|---|---|
| | Chen et al. | (45) Date of Patent: | Nov. 24, 2020 |

(54) TWO-WHEEL SELF-BALANCING VEHICLE WITH PLATFORM BORNE SENSOR CONTROL

(71) Applicants: Shane Chen, Camas, WA (US); Ywanne Chen, Camas, WA (US)

(72) Inventors: Shane Chen, Camas, WA (US); Ywanne Chen, Camas, WA (US)

( * ) Notice: Subject to any disclaimer, the term of this patent is extended or adjusted under 35 U.S.C. 154(b) by 0 days.

(21) Appl. No.: 15/229,060

(22) Filed: Aug. 4, 2016

(65) Prior Publication Data

US 2018/0037293 A1 Feb. 8, 2018
US 2020/0031423 A9 Jan. 30, 2020

Related U.S. Application Data

(60) Provisional application No. 62/201,071, filed on Aug. 4, 2015.

(51) Int. Cl.

| *B62K 23/08* | (2006.01) |
|---|---|
| *B62K 3/00* | (2006.01) |
| *B62K 11/00* | (2006.01) |
| *B62J 99/00* | (2020.01) |
| *B62M 7/12* | (2006.01) |
| *B62J 45/20* | (2020.01) |
| *B62J 45/40* | (2020.01) |

(52) U.S. Cl.
CPC ............... *B62K 23/08* (2013.01); *B62J 99/00* (2013.01); *B62K 3/002* (2013.01); *B62K 11/007* (2016.11); *B62M 7/12* (2013.01); *B62J 45/20* (2020.02); *B62J 45/40* (2020.02); *B62K 2204/00* (2013.01)

(58) Field of Classification Search
CPC ....... B62K 23/08; B62K 11/007; B62K 3/002
See application file for complete search history.

(56) References Cited

U.S. PATENT DOCUMENTS

| 8,442,661 | B1 * | 5/2013 | Blackwell | ............... | B25J 9/1689 |
|---|---|---|---|---|---|
| | | | | | 700/245 |
| 8,606,468 | B2 * | 12/2013 | Kosaka | ................ | B62K 11/007 |
| | | | | | 180/219 |
| 9,376,155 | B2 * | 6/2016 | Ying | ..................... | B62D 51/001 |
| 9,656,688 | B2 * | 5/2017 | Ying | ..................... | B62D 11/003 |
| 9,827,984 | B2 * | 11/2017 | Liu | ......................... | G05D 1/024 |
| 10,059,397 | B2 * | 8/2018 | Zheng | .................. | B62K 11/007 |
| 2006/0260862 | A1 * | 11/2006 | Nishikawa | ............. | B62K 17/00 |
| | | | | | 180/315 |
| 2008/0164083 | A1 * | 7/2008 | Miki | ....................... | B60L 15/20 |
| | | | | | 180/165 |

(Continued)

*Primary Examiner* — Jacob D Knutson
(74) *Attorney, Agent, or Firm* — Steven J. Sullivan

(57) ABSTRACT

A two-wheel, self-balancing transportation device having a foot platform zone associated with each wheel. Various sensor or control arrangements are disclosed. In one embodiment, torsion sensing is used to determine a rider's fore-aft weight distribution on one foot platform zone relative to the other. The torsion-based sensing is preferably combined with fore-aft platform position sensing to achieve a driving and turning of the device. In another embodiment, pressure sensors are used to determine a rider's fore-aft weight distribution on one foot platform zone relative to the other. In yet another embodiment, a relative position sensor is used to determine the relative position of movable platforms sections. Other features and embodiments are also disclosed.

26 Claims, 6 Drawing Sheets

(56) References Cited

U.S. PATENT DOCUMENTS

| | | | | |
|---|---|---|---|---|
| 2009/0288900 | A1* | 11/2009 | Takenaka | B62K 11/007 180/218 |
| 2012/0166048 | A1* | 6/2012 | Inoue | G05D 1/0061 701/49 |
| 2013/0228385 | A1* | 9/2013 | Chen | B62K 3/007 180/6.5 |
| 2013/0238231 | A1* | 9/2013 | Chen | B62K 11/007 701/124 |
| 2015/0096820 | A1* | 4/2015 | Strack | B62K 11/007 180/181 |
| 2015/0239499 | A1* | 8/2015 | Lan | G01L 1/22 701/41 |
| 2016/0325803 | A1* | 11/2016 | Waxman | B62M 7/12 |
| 2017/0088212 | A1* | 3/2017 | Edney | B60W 40/13 |
| 2017/0101129 | A1* | 4/2017 | Ying | B62D 11/003 |
| 2017/0106931 | A1* | 4/2017 | Wood | B62K 11/007 |
| 2017/0166278 | A1* | 6/2017 | Lu | B62K 3/007 |
| 2017/0217529 | A1* | 8/2017 | Chen | B62K 11/007 |
| 2017/0233023 | A1* | 8/2017 | Chen | B62K 25/00 280/63 |

* cited by examiner

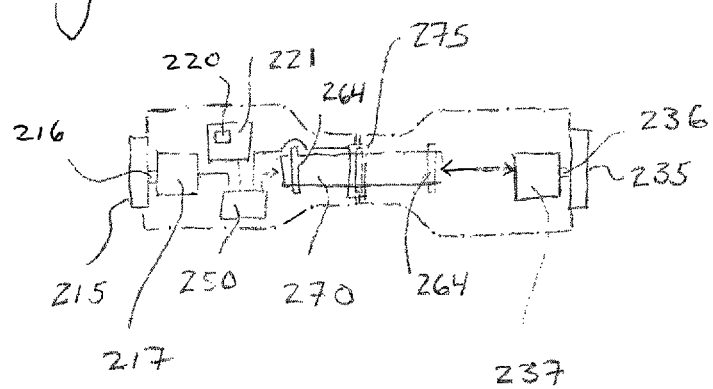

TWO-WHEEL SELF-BALANCING VEHICLE WITH PLATFORM BORNE SENSOR CONTROL

CROSS-REFERENCE TO RELATED APPLICATION

This application claims the benefit of earlier filed provisional application No. 62/201,071, filed Aug. 4, 2015, and having the same title and inventors as above.

FIELD OF THE INVENTION

The present invention relates to two-wheel, self-balancing vehicles and, more specifically, to such vehicles in which sensors (pressure, torsion, displacement, etc.) are provided in the foot platform and used to control operation of the device.

BACKGROUND OF THE INVENTION

A first group of prior art two-wheel self-balancing vehicles is represented by a product known commonly as the "Segway." This product is disclosed in U.S. Pat. No. 6,302,230, issued to Sramek et al (the '230 patent). While a contribution in the field, the Segway and like devices are disadvantageous in that they are large, heavy and expensive, i.e., too heavy to be carried by a commuter or youth, too expensive for most to buy. Furthermore, turning is achieved through a handle bar structure that ascends from the platform upward toward the chest of a user. The large handle bar structure prevents hands free operation, hence a rider does not have hands free for a phone, camera, beverage, shopping bag or the like (or to protect oneself in the event of an accident). In addition, the tall steering structure is a trip hazard when a user makes an unplanned exit from the vehicle.

Another group of prior art two-wheel self-balancing vehicles has two movable platform sections, each associated with a given wheel, that tilt from side-to-side as a user leans left or right. The two platform sections move in a linked or "dependent" manner. These devices typically require a multi-component parallelogram structure to coordinate/link movement of the two platform sections and the wheels. Such componentry adds to the weight, bulk, complexity, and potential for mechanical failure of the device.

Yet another prior art two-wheel self-balancing vehicles is that taught in U.S. Pat. No. 8,738,278 issued to Shane Chen (inventor herein) for a Two-Wheel, Self-Balancing Vehicle with Independently Movable Foot Placement Sections. This patent is hereby incorporated by reference. The device of the '278 patent may have two movable platform sections that are rotatably movable from one another. Each section may possess self-balancing features that permit a user to turn the device by leaning (rotating) one platform section more than the other, including rotating the platform sections in different directions so that the wheels move in different directions, effectively pivoting the device.

The prior art also includes U.S. Pat. No. 7,481,291 for a Vehicle Steerable by Movement of Center of Gravity, issued to Nishikawa. This patent discloses the use of multiple platform sensors to control motors that drive wheel is a two or more wheel device. The '291 does not disclose conventional self-balancing or the use of a gyroscopic or position sensor. Without a gyroscopic or position sensor and some degree of conventional self-balancing, the device is very difficult to use.

A need exists for a two-wheel self-balancing device that provides comfortable hands-free control, and is light-weight and compact, easy and safe to use, and that may be made in a cost-effective manner. A need also exits for such a two-wheel self-balancing device that is maneuverable and ergonomic (functioning more naturally with the bio-mechanics of a user's legs and body).

SUMMARY OF THE INVENTION

Accordingly, it is an object of the present invention to provide a two-wheel, self-balancing device that overcomes the shortcomings of the prior art.

It is another object of the present invention to provide a two-wheel, self-balancing device that has a sensor or sensors located on the platform that may be used to control operation of the device.

It is also an object of the present invention to provide a two-wheel, self-balancing device in which one or more pressure, torsion, displacement or other sensor(s) are provided in or on the foot platform and permit a rider to turn the device by shifting their weight on the foot platform zones.

Further it is an object of the present invention to provide a two-wheel self-balancing device that utilizes both position based sensing and platform pressure sensing to control operation of the device.

These and related objects of the present invention are achieved by use of a two-wheel, self-balancing vehicle with platform based sensors as described herein.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIGS. 5-6 are a perspective view and a bottom view, respectively, of a two-wheel, self-balancing device utilizing a relative position sensor to affect device control.

DETAILED DESCRIPTION

Figure 1:
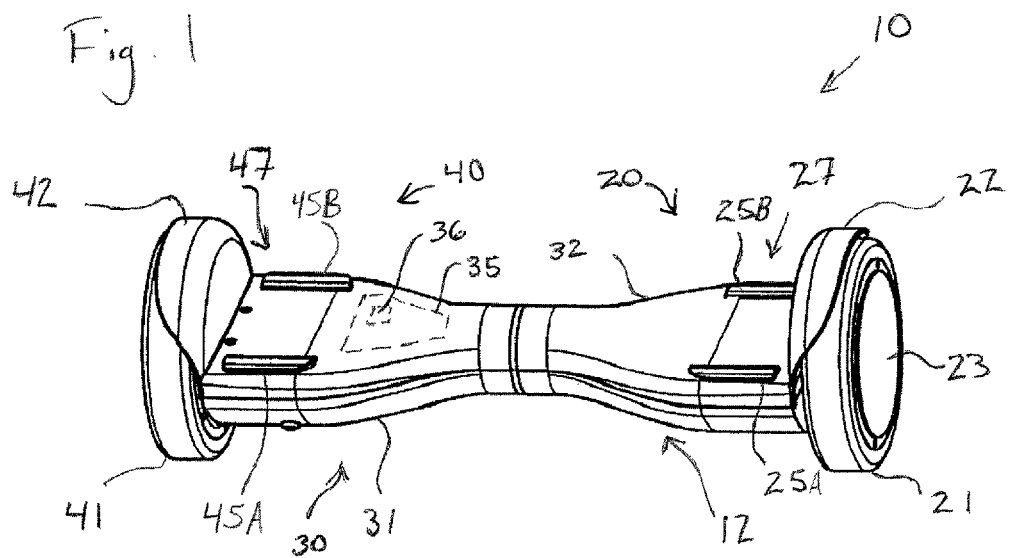
FIGS. 1-3 are a perspective, elevation and bottom view, respectively, of a two-wheel, self-balancing device utilizing pressure sensors to affect device control.
Figure 2:
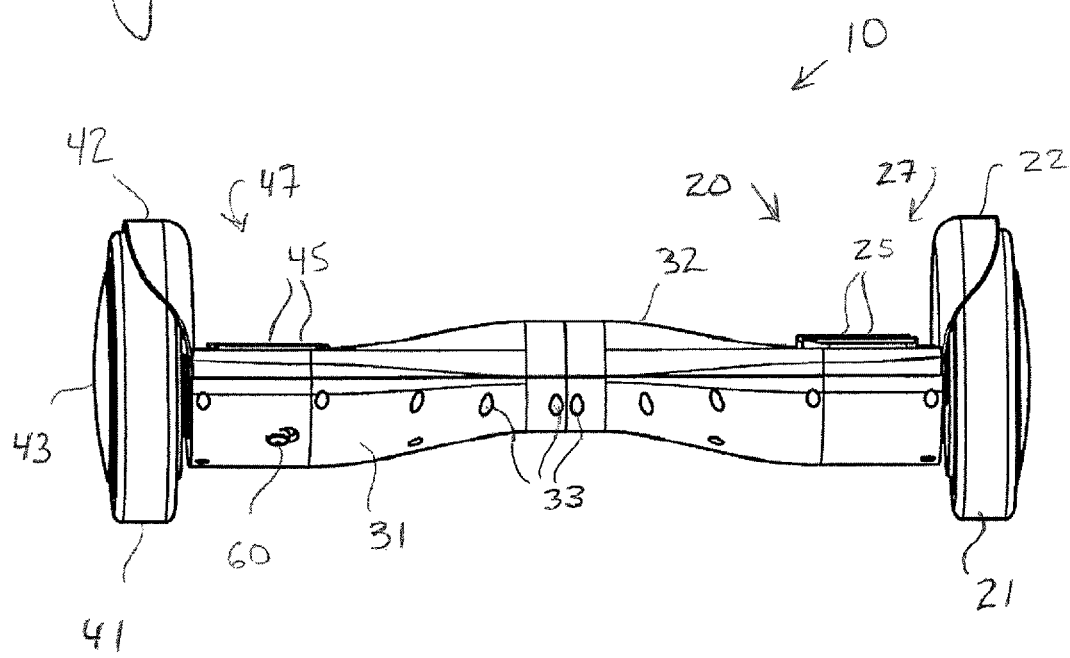
Figure 3:
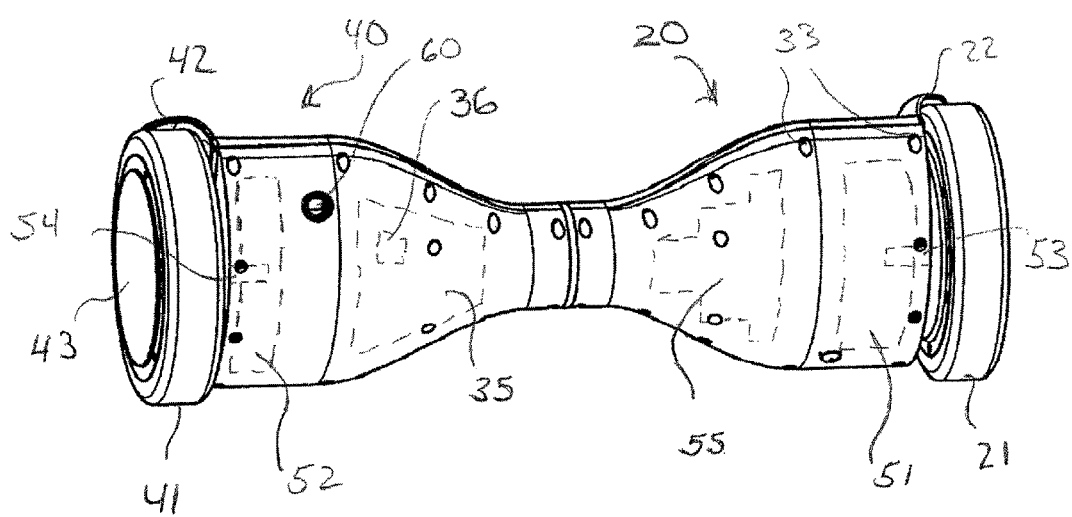

Referring to FIGS. 1-3, a first embodiment of a two-wheel, hands-free self-balancing device 10 in accordance with the present invention is shown.

Device 10 may include a platform 12 and first and second wheels 21,41. The platform 12 preferably has a first section 20 associated with first wheel 21 and a second section 40 associated with second wheel 41. These may be the right and left sides, as they support the left and right foot during use, or vice versa. In a preferred embodiment, device 10 is configured such that it can be mounted and used from either direction so that the first and second platform sections 20,40 may be the right or the left side, depending on the direction from which the device is mounted. FIG. 2 illustrates that device 10 may ascend towards the middle, thereby directing a riders feet towards the outer right and left side (over top of the sensors). For frame of reference in describing the device, it may have a lateral axis running side to side and a longitudinal axis running substantially in the direction of travel.

Device 10 preferably includes a housing 30 that may have a bottom 31 and top 32 sections. These sections may be configured to hold requisite components (motors, battery, circuit board, sensors, etc.) inside while defining first and second foot placements zones 27,47. As seen in FIG. 2, these zones are symmetrically disposed about the center of the device. They may be bordered by a corresponding fender 22,42 and the ascending portion of the top housing 32.

Each of the foot placement zones 27,47 preferably include pressure sensors 25A-B,45A-B, respectively. These sensors are preferably located near the fore-aft "edges" of the platform zones. While these sensors may detect the amount of a rider's weight on either side, since there are two sensors per zone and they are located under the ball and heel region of a rider foot, respectively, they may detect whether a rider is leaning forward or backward on a given platform zone.

Sensors 25A-B,45A-B may be resistive pressure sensors in which the resistance generated by the sensor changes based on the physical pressure applied to the sensor. Suitable pressure sensors of this or other types are known in the art. The sensors 25,45 are coupled to control electronics 35 provided on a circuit board. A fore-aft position detecting sensor 36 may be provided on the same circuit board or otherwise located. This sensor may be a gyroscopic sensor. Suitable fore-aft position detecting sensors are known in the art.

Referring to FIG. 3, device 10 also preferably includes drive motors 51,52 respectively coupled through axles 53,54 to corresponding wheel 21,41. The batteries power the electronic control, the motors and the sensors. Control electronics 35 receives fore-aft (i.e., lean) position data from position sensor 36 and weight or pressure data from sensors 25A-B,45A-B.

FIGS. 1-3 also shown screw openings 33 through which screws or other fasteners are inserted to mount the bottom housing section 31 to the top housing section 32. End plates or hub caps 23,43 protect each wheel from interference and may provide an aesthetic aspect.

A First Use and Programmed Embodiment

In use, in a first embodiment, the device may be turned on at switch 60, and is preferably programmed to immediately self-balance. A user then places his or her first foot in one of the platform zones and a second foot in the other platform zone.

Device 10, in this first embodiment, may be programmed to operate as follows. If the rider's weight is disposed substantially evenly over the two foot zones (as detected by sensors 25,45) and the rider leans forward, the wheels are driven forward, straight ahead. If a rider leans backwards, the device is driven backwards. This is substantially the same as operation of the Segway or the device of U.S. Pat. No. 8,738,278 or other known two wheel fore-aft self-balancing devices.

To turn device 10, a user shifts his or her weight, providing more weight on one of the foot placement zones. In this embodiment, control electronics 35 are preferably programmed so that if the weight is increased in one placement zone then the wheel associated with that placement zone is driven faster. For example, if more weight is placed on (or shifted to) zone 27, then wheel 21 is driven faster than wheel 41, causing device 10 to turn. This experience is similar to that of downhill skiing where to turn left a skier takes weight off their left leg, thereby placing more weight on the "downhill leg" which is now the right. Thus, in the present example, as a rider takes weight off platform zone 47, that wheel 41 slows relative to wheel 21.

In one configuration of this embodiment, speed may be increased or decreased in increments. These may be +/−1, +/−2, +/−3, etc. For example, as a rider places a little more weight on sensors 25, the control electronics drive motor 51 and wheel 21 one increment (say 1 mph) more and drive motor 52 and wheel 41 one increment less. As the weight on sensors 25 increases, the drive becomes two increments more on wheel 21 and two increments less on wheel 41.

At some point, it is possible for the minus increment amount to be greater than the forward drive amount (supplied/influenced by sensor 36) on a given wheel. This would result in the lesser weight side being driven in the opposite direction, resulting in more of a pivoting action of the device. For example, if based on forward lean (detected by sensor 36), the device should be traveling at 1 mph forward, yet the side to side lean of the user weights sensors 25,45 such that there is a +/−2 increment in favor of sensor 25 and wheel 21, then wheel 21 may be driven at 3 mph forward and wheel 41 and 1 mph in reverse.

A Second Use and Programmed Embodiment

In another embodiment of the present invention, called the "second embodiment" form purposes of this application, the sensors 25,45 and control electronics 35 of device 10 are preferably configured and/or programmed to detect the relative weight on each sensor (A and B) in a sensor pair. They may, for example, generate a ratio A:B for each sensor pair. This way, it can be determined if a rider is leaning forward or backward in each platform zone 27,47. If a rider is leaning forward, based on the relative weight detected by the sensor pair, then the speed of the corresponding wheel is incremented in the forward direction. Similarly, if leaning back, then the speed of that wheel is incremented in the reverse direction. The magnitude of the increment may be based on the magnitude of the weight difference between the paired sensors (A and B). In use, the ratio A:B of one sensor pair (e.g., right) may be compared to the ratio A:B of the other sensor pair (e.g., left). If A/Bleft> or <A/Bright then a twisting force is detected, and a turn will occur. If A/Bleft=A/Bright, then there is no twisting force and no turn will be initiated (the rider is balanced upright or leaning forward or backward with both feet equally). The determination of twisting force may be achieved in several ways without departing from the present invention.

For example, in a related in use scenario, a rider may stand on device 10 with his or her feet in the direction of sensors 25B and 45B, thus with the right foot in zone 27 and the left in zone 47. In addition to the driving of wheels 21,41 based on fore-aft position data (sensor 36), placing more weight on sensor 25B than 25A will cause motor 51 to increase the speed of wheel 21 in what is now the forward direction. If the weight over sensors 45A and 45B stays approximately equal to each other, then the speed of wheel 41 will not be increased (over the fore-aft balancing speed) and device 10 will turn to the left (in the perspective of FIG. 1).

If the weight on the rider's left foot is rocked forward such that more weight is on sensor 45B than 45A, then wheel 41 will increase in forward speed. Similarly, if the foot is rocked back, i.e., more weight on sensor 45A than sensor 45B, then wheel 41 will be slowed or driven in the opposite (rearward) direction, depending on the relative magnitude of the backward lean and the overall fore-aft position of device 10. Furthermore, if in this example a rider places more weight on sensor 25A than 25B, i.e., rocking or leaning on the right foot heel, then wheel 21 will be driven in reverse.

Thus, by having fore-aft sensor pairs (A,B) in each foot zone, a rider can achieve independent movement of each wheel, yet with a continuous platform 12.

Position Sensor and Pressure Sensors

Referring to U.S. Pat. No. 8,738,278, this patent achieved independent control of each wheel, yet it was achieved with a platform having two sections (like 20 and 40 herein) that are movable with respect to each other, for example, coupled through a rotatable shaft or having a platform structure with a sufficient degree of flexibility. A fore-aft sensor in each platform permitted a user to independently control the speed and direction of each wheel based on the fore-aft tilt induced by the rider on a given platform section compared to a "zero tilt" or balanced position. Within the present invention, a similar performance can be achieved yet without the need for two independently movable or rotatably coupled platform sections.

Figure 4:
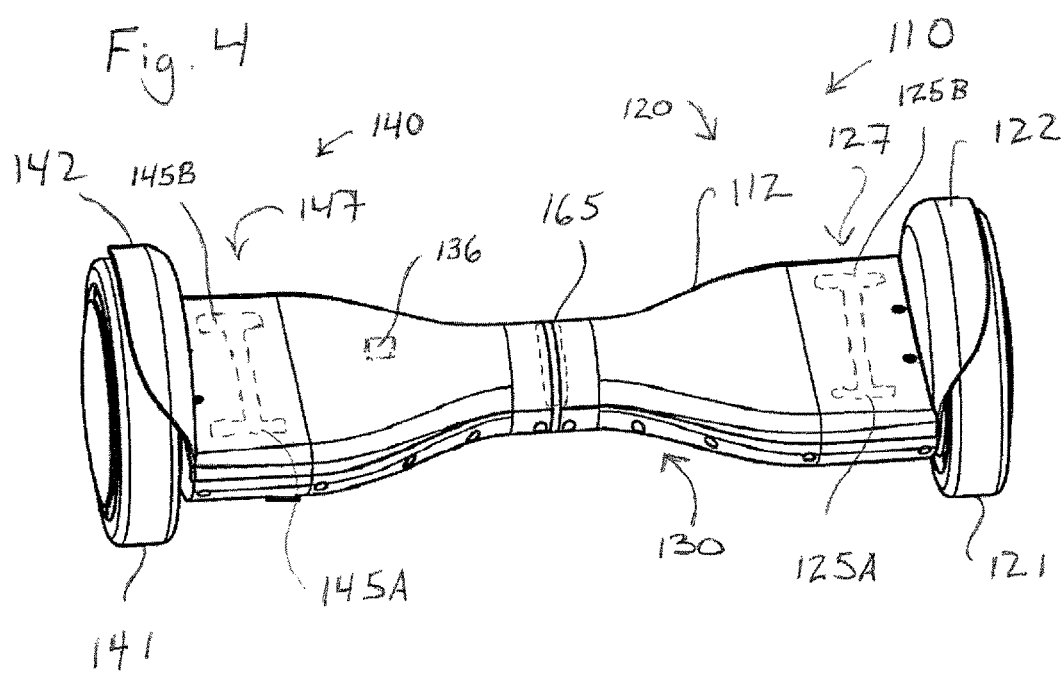
FIG. 4 is a perspective view of a two-wheel, self-balancing device utilizing a torsion sensor to affect device control.

Referring to FIG. 4, a perspective view of two other embodiments of a two-wheel self-balancing device 110 in accordance with the present invention is shown.

In one of these embodiments, the sensors 25A-B,45A-B of FIG. 1 (that are positioned in the platform zones and may extend above the surface of the platform zone) are not used and instead a torque or torsion sensor 165 is provided near where the two platform sections 120,140 meet. The torsion sensor 165 is configured to detect a "twisting" of the platform sections relative to each other. This difference is then used to turn the device. Twisting one platform section more forward than the other causes the wheel associated with the more forward twisted platform section to rotate faster in the forward direction than the other wheel, thereby causing a turn. By analogy, the same is true for turning in the reverse direction (and for either wheel).

A gyroscopic or position sensor 136 may be provided as well as control electronics (as discussed with control electronics 35 above). The position sensor may be used to determine the position of the platform relative to a default balance position. The magnitude and direction of the difference between a measured position and the default or steady-state balanced position may be used to drive the platform towards self-balancing. The twist in the platform, depending on its direction, may be used to accelerate or decelerate the drive towards balance (via the speed of the respective wheel) and affect turning.

The drive motors, battery(ies) and position sensor discussed above for device 10 are suitable for use in device 110 and operate in substantially the same way. Suitable control electronics are known in the art.

The general speed and direction of device 110 is based on the position indicated by the fore-aft sensor 136, and turning is achieved by a detection of a rider leaning forward on one foot relative to the other, as detected by torsion sensor 165. While illustrated as a band or ring in FIG. 4, the torsion sensor may have other shapes, including a more longitudinal shape that extends into both platform sections 120,140. A strain gauge torsion sensor is one suitable torsion sensor among others. Torsion sensors are known in the art.

FIG. 4 also illustrates platform 112 (that includes platform sections 120,140), housing 130, and fenders 122,142 that are analogous to platform 12, housing 30 and fenders 22,42 of FIG. 1.

In another embodiment shown in FIG. 4, the centralized torsion sensor need not be present but two displacement or surface pressure sensors 125,145 are preferably provided. These surface sensors may be similar to sensors 25,45 or device 10 and preferably include edge sensor components A,B. Sensors 125A-B,145A-B are preferably substantially flush with the surface of the platform, to thereby not impede foot placement or movement on or in a platform zone.

Sensors 125A-B,145A-B permit detection of forward or backward lean on each foot platform 120,140, respectively. As discussed to herein and in U.S. Pat. No. 8,738,278, which is hereby incorporated by reference, this sensor arrangement permits independent control of wheels 121,141 in a manner similar to how fore-aft lean on each foot platform in the '278 patent permits independent control of the corresponding wheel. Further, by comparing weight differential between the two sensors 125,145 the amount of lean can be detected and that can be used to improve turning (for example, by accelerating it, or in some instances slowing the device down during a turn for safety reasons).

In one embodiment, the position or gyroscopic sensor may give an absolute value for being balanced and monitor displacement from the "balanced state." User weight on the platform surface sensors 125A-B,145A-B provides input to control the speed and the direction of the vehicle (in collaboration with the position sensor) in the same or similar manner that rotation of the platform sections fore or aft in the '278 patent controlled the speed and turning of that device.

It should be noted that displacement sensors and any other sensors capable of detecting a shift or change in weight within a foot platform zone 27,47,127,147 may alternatively be used in the present invention.

The battery 55 may be a rechargeable lithium ion battery or other suitable battery. Batteries of this type are known in the art.

The control electronics 35 may include a processor or programmable gate arrays, or an ASIC, or other electronic components that can receive and process control signal and drive the wheel motors appropriately in response thereto.

The device 10 is also preferably be programmed for safety. This may include (but is not limited to) shutting the device down if one motor is driving at an excessive speed, if a motor is not working correctly, initiating an alarm sound or warning to alert a rider to shut down or other important condition (wheel issue, etc.).

Wheels 21,41,121,141,215,235 may have a hub motor or other configuration. Hub motors are well known in the art.

Movable Platform Section Embodiment

Figure 5:
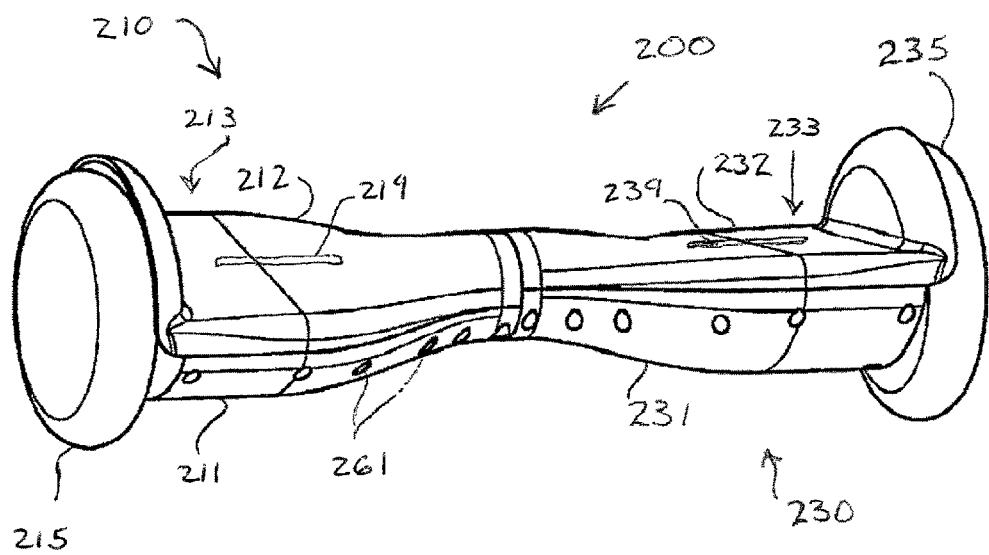

Referring to FIGS. 5-6, is perspective view and a bottom view of a two-wheel, self-balancing vehicle device 200 with independently movable platform sections in accordance with the present invention are shown. Device 200 may include a fore-aft position sensor 220 (similar to sensor 36 described above) on one platform section and have a sensor 275 that detects the position of the other platform section relative to the first (to the platform section with the fore-aft sensor). This achieves a two-wheel self-balancing device with one fore-aft sensor associated with one platform section as opposed to having an independent fore-aft sensor in each platform section.

Vehicle 200 may have a first and a second platform sections 210,230. Each platform section 210,230 may include a housing formed of a bottom housing member 211,231 and a top housing member 212,232. The top housing members may have a foot placement section or area 213,233 formed integrally therewith or affixed thereon. The foot placement section is preferably of sufficient size to receive the foot of a user and may include a tread or the like for traction and/or comfort.

The housing may be formed of metal, sturdy plastic or other suitable material. The housing members may be molded and incorporate strengthening reinforcements, and be shaped to receive and "nest" the internal components (discussed below) of the vehicle. The bottom and top housing sections are formed complementarily so that after the internal components are installed, the top housing section is fitted onto the bottom housing section and secured with screws or other fasteners. FIG. 5 illustrates holes 261, through which the fasteners are inserted.

Each platform section includes a wheel 215,235, and each wheel preferably has an axle 216,236 and motorized hub assembly or drive motor 217,237 (shown in FIG. 6). Motorized hub assemblies and drive motors are known in the art.

Referring to FIG. 6, a block diagram of components within vehicle 200 in accordance with the invention is shown. The dot-dash line represents a rough outline of the housing members. Platform section 210 preferably includes a fore-aft position sensor 220 which may be a gyroscopic sensor, for measurement of the fore-aft position of that platform section. The sensor 220 is preferably mounted on circuit boards 221 that may be attached to the interior of the bottom housing 211. Sensed position information from sensor 220 is used to drive the corresponding motor 217 and wheel 215. The control electronics 250 for translating position data to motor drive signals is preferably also located in bottom housing 211. Control electronics 250 may be electrically connected to sensor 220 and to drive motors 217,237 (electrical conduits connecting through the connecting shaft 270) and to relative position sensor 275. The relative position sensor measures the position of the other platform section (here platform section 230) relative to platform section 210.

Thus, with the position of platform section 210 known from sensor 220 and the position of platform section 230 known from its relative position to platform section 210 (sensor 275), then the position of both platforms section is known and the platform sections may independently control the driving of their respective wheels, based on their respective tilt (magnitude and direction) and the overall tilt of the device.

Since the platform sections may rotate or pivot with respect to one another, the left section 210, for example, may tilt forward while the right section tilts backward. This would cause the wheels to be driven in opposite directions, causing a user to spin-in-place or "pirouette" much like a figure skater. Alternatively, the platform wheels could be tilted in the same direction, but one platform more than the other. This would cause the wheel associated with the more steeply tilted platform to drive faster, thus causing the vehicle to turn. The sharpness of the turn could be readily adjusted by the user based on the relative tilt of the platform sections.

This leg movement to control turning is a very ergonomic and natural movement, akin to skiing and other gliding/sliding activities.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A transportation device, comprising:
   a load bearing platform having a first section configured to receive a foot of a rider and a second section configured to receive another foot of a rider;
   a first wheel and a second wheel coupled to the platform;
   a first drive motor that drives the first wheel and a second drive motor that drives the second wheel;
   a strain sensor; and
   a control circuit coupled to the strain sensor and the first and second drive motors that drives the first and second wheels based, at least in part, on data from the strain sensor;
   wherein the strain sensor is configured with the platform so as to sense torsional strain when the first and second sections are torsionally stressed relative to one another.

2. The device of claim 1, further comprising a position sensor coupled to the control circuit that senses a position of the platform.

3. The device of claim 2, wherein the control circuit drives the first and second wheels towards auto-balancing the device based on data from the position sensor.

4. The device of claim 3, wherein the platform is rotatable in fore-aft relative to the wheels and the position sensed by the position sensor is indicative of a fore-aft tilt angle of the platform.

5. The device of claim 3, wherein the platform is located between the first and second wheels.

6. The device of claim 1, further comprising a position sensor coupled to the control circuit that senses a position of the platform; and
   wherein data from the strain sensor influences a turning of the device and data from the position sensor influences an auto-balancing of the device.

7. The device of claim 1, wherein the strain sensor is configured as a torque sensor.

8. A transportation device, comprising:
   a load bearing platform;
   a first wheel and a second wheel coupled to the platform;
   a first drive motor that drives the first wheel and a second drive motor that drives the second wheel;
   a strain sensor; and
   a control circuit coupled to the strain sensor and the first drive motor that drives the first wheel based, at least in part, on data from the strain sensor;
   wherein the platform includes a first section configured to receive a foot of a rider and a second section configured to receive another foot of a rider; and
   wherein the strain sensor is configured with the platform so as to sense torsional strain between the first and second sections.

9. The device of claim 8, further comprising a position sensor coupled to the control circuit that senses a position of the platform.

10. The device of claim 9, wherein the platform is rotatable in fore-aft relative to the wheels and the position sensed by the position sensor is indicative of a fore-aft tilt angle of the platform.

11. The device of claim 10, wherein data from the strain sensor influences a turning of the device and data from the position sensor influences an auto-balancing of the device.

12. A transportation device, comprising:
   a load bearing platform having a first section configured to receive a foot of a rider and a second section configured to receive another foot of a rider;
   a first wheel and a second wheel coupled to the platform;
   a first drive motor that drives the first wheel and a second drive motor that drives the second wheel;
   a torque sensor;

a position sensor; and a control circuit that drives the first and second wheels based on data from the torque sensor and the position sensor;

wherein the torque sensor is configured with the platform so as to sense torsional strain when the first and second sections are torsionally stressed relative to one another.

13. The device of claim 12, wherein the control circuit drives the first and second wheels towards auto-balancing the device based on data from the position sensor.

14. The device of claim 12, wherein data from the torque sensor influences a turning of the device and data from the position sensor influences an auto-balancing of the device.

15. The device of claim 12, wherein the platform, wheels and position sensor are configured so that the position sensor senses a position indicative of the fore-aft tilt angle of the platform.

16. The device of claim 12, wherein the platform is located between the first and second wheels.

17. A transportation device, comprising:

a load bearing platform;

a first wheel and a second wheel coupled to the platform;

a first drive motor that drives the first wheel and a second drive motor that drives the second wheel;

a strain sensor; and a control circuit, coupled to the strain sensor and the first and second drive motors, that drives the first and second wheels based, at least in part, on data from the strain sensor;

wherein the platform includes a first section configured to receive a foot of a rider and a second section configured to receive another foot of a rider; and wherein the strain sensor is configured with the platform so as to sense strain when the first and second sections are stressed relative to one another.

18. The device of claim 17, wherein the strain sensor is configured with the platform so as to sense torsional strain when the first and second sections are torsionally stressed relative to one another.

19. The device of claim 17, wherein the strain sensor is configured as a torque sensor.

20. The device of claim 17, further comprising a position sensor coupled to the control circuit that senses a position of the platform;

wherein the control circuit drives the first and second wheels towards auto-balancing the device based on data from the position sensor.

21. The device of claim 17, further comprising a position sensor coupled to the control circuit that senses a position of the platform; and wherein data from the strain sensor influences a turning of the device and data from the position sensor influences an auto-balancing of the device.

22. The device of claim 17, wherein the platform is located between the first and second wheels.

23. A transportation device, comprising:

a load bearing platform;

a first wheel and a second wheel coupled to the platform;

a first drive motor that drives the first wheel and a second drive motor that drives the second wheel;

a torque sensor that is configured with the platform to sense a twisting force applied across a portion of the platform; and a control circuit coupled to the torque sensor and the first and second drive motors that drives the first and second wheels based, at least in part, on data from the torque sensor.

24. The device of claim 23, wherein the platform includes a first section configured to receive a foot of a rider and a second section configured to receive another foot of a rider; and wherein the torque sensor is configured with the platform so as to sense torque when the first and second sections are torsionally stressed relative to one another.

25. The device of claim 23, further comprising a position sensor coupled to the control circuit that senses a position of the platform;

wherein the control circuit drives the first and second wheels towards auto-balancing the device based on data from the position sensor.

26. The device of claim 25, wherein data from the torque sensor influences a turning of the device and data from the position sensor influences an auto-balancing of the device.

* * * * *